United States Patent [19]

Cass et al.

[11] 4,119,455
[45] Oct. 10, 1978

[54] METHOD OF RECOVERING IRON-BEARING BY-PRODUCT FLUE DUST

[75] Inventors: Boyd E. Cass, Ligonier; David W. Coate; Joseph R. Quigley, both of Pittsburgh, all of Pa.

[73] Assignee: Carad, Inc., Pittsburgh, Pa.

[21] Appl. No.: 837,386

[22] Filed: Sep. 28, 1977

[51] Int. Cl.$^2$ .................................................. C22B 7/02
[52] U.S. Cl. ............................................. 75/25; 75/3; 75/30; 75/257
[58] Field of Search .......................... 75/25, 3, 30, 257

[56] References Cited

U.S. PATENT DOCUMENTS

| | | | |
|---|---|---|---|
| 1,038,370 | 9/1912 | Hubner | 75/25 |
| 1,158,364 | 10/1915 | Bibb | 75/25 |
| 1,741,544 | 12/1929 | Slagle et al. | 75/25 |
| 2,799,571 | 7/1957 | Justice et al. | 75/25 |
| 3,316,081 | 4/1967 | Bratton | 75/25 |
| 3,374,085 | 3/1968 | Stone | 75/25 |
| 3,567,811 | 3/1971 | Humphrey | 75/25 |
| 3,770,416 | 11/1973 | Goksel | 75/25 |
| 3,948,638 | 4/1976 | Pietsch | 75/25 |

*Primary Examiner*—M. J. Andrews
*Attorney, Agent, or Firm*—Carothers and Carothers

[57] ABSTRACT

A method of recovering iron-bearing flue dust collected as a by-product in wet sludge or dry form from metallurgical processes for recycling. The moisture content of the collected flue dust is adjusted to a level at which the wet dust is of a plastic consistency such that it will extrude into cohesive agglomerates (generally 8 – 16% moisture content). If the dust is collected in a dry state, moisture is added; if collected in a wet state, the moisture content is adjusted by the addition of a complimentary dry material. Hydraulic cement is added to the mixture in the range of approximately 4 – 15% by weight and the mixture is extruded into cohesive agglomerates and thereafter cured for subsequent charging to metallurgical furnaces.

20 Claims, 2 Drawing Figures

METHOD OF RECOVERING IRON-BEARING BY-PRODUCT FLUE DUST

BACKGROUND OF THE INVENTION

1. Field of the Invention

This invention relates generally to the art of agglomeration and more particularly to methods of forming agglomerates of iron-bearing flue dust collected as a by-product from metallurgical processes for recycling the otherwise waste by-product.

2. Discussion of the Prior Art

Dust collectors in metallurgical making operations, such as in the making of iron and steel, collect large quantities of particulate matter which can be generally categorized as flue dust. Most of this material is discarded as waste. However, mush of it contains valuable material which can be profitably recycled in metallurgical processes.

Much of it is collected in the form of dry granules or dust from cyclones or bag houses. This dry material is presently being recycled by pelletizing or briquetting as described for example in U.S. Pat. Nos. 3,316,081; 1,158,364; 1,741,544; and 1,038,370.

When the flue dusts are collected in the form of a wet sludge which is generated from wet scrubber operations, the problem of recycling becomes much more difficult. In order to recycle these materials using conventional or known agglomerating technology, the wet sludge must first be dried down, which is an expensive and relatively difficult operation. After the material is dried down, it is then agglomerated in the fashion previously described with regard to dry dust collected from cyclones or bag houses. In either event, agglomeration of these dry dusts can also produce hazardous dust conditions in manufacturing the agglomerate, and the ultimate size of the agglomerate is not readily controllable and is generally too small for many furnace charge applications which require the free flow of air and oxygen throughout the furnace charge.

As an example of one such iron-bearing flue dust, B.O.F. flue dust is found in great abundance in steel making operations, either in dry form in cyclones or bag houses as collected from precipitators or in wet form in the form of a B.O.F. sludge which is discharged from a wet scrubber on a B.O.F. operation. The discharge from the wet scrubber is pumped into a thickening tank where most of the particulate matter settles out. This thickened material is then pumped into a vacuum filter where more of the water is removed. The resulting filtercake material is generally designated or called B.O.F. sludge, and contains about 30% moisture and has an approximate composition range as follows:

| Iron oxides | 65– 90% | MnO | 1–3% |
|---|---|---|---|
| Manganese oxides | 1– 4% | $Na_2O$ | .01–4% |
| Phosphorus | .05– .2% | $K_2O$ | .01–2% |
| $SiO_2$ | 1– 4% | Pb | .01–.6% |
| $Al_2O_3$ | .1– 1% | Zn | .05–.5% |
| CaO | 4– 10% | S | .05–1% |

Other flue dusts which contain valuable constituents for recycling may also be found as a by-product in dry or wet form from iron-bearing sludges or dust generated in steel making operations from cyclones, bag houses or wet scrubbers on blast furnaces, electric furnaces, and cupola furnaces. Of particular interest, due to the valuable manganese content, are dry or wet manganese-bearing dusts or sludges such as those collected from ferromanganese blast furnace operations.

In agglomerating these fine mill waste dusts for recycling, it is necessary to form agglomerates with sufficient strength such that the material can be handled without undue breakage. In addition, if these agglomerates are to be recharged to a blast, cupola, or electric furnace, it is also important that the agglomerates have adequate size and good load-bearing capacity, both at low and elevated temperatures. If they do not, the agglomerates will readily decompose in the furnace thereby creating fines which in turn diminishes the void spaces in the furnace charge. These voids are very important in such furnaces for gas flow for proper furnace operation. The recycling and agglomeration techniques of the prior art do not satisfactorily provide an economic method of agglomeration, nor do they satisfactorily provide resultant agglomerates which will meet these requirements.

SUMMARY OF THE INVENTION

The method of the present invention for recovering iron-bearing flue dusts collected either in a dry or sludge condition as a by-product from metallurgical processes for recycling comprises the steps of adjusting the moisture content of the flue dust to a level at which the wet dust is of a plastic consistency which will extrude into cohesive agglomerates (such as through the use of a conventional auger screw extruder), mixing this dust of adjusted moisture content with sufficient hydraulic cement to rigidly bond the mixture into a cohesive mass after curing, then extruding the mixture through an extrusion die into cohesive agglomerates of desired size, and thereafter curing the extruded agglomerates.

The mixture of proper extrudable plasticity will generally be found to have a moisture content in the range of about 8 – 16% by weight. If the iron-bearing flue dust is collected in a dry condition, the moisture content is increased to the prescribed level by the addition of water. If the iron-bearing dust is collected in the form of a sludge, the moisture content is generally 30 – 35%. Under some conditions, such as natural air drying of the sludge, the moisture content can be expected to be less, but would not be expected to fall below 18 – 20% by weight, for example. The sludge may be dried down by artificial methods to the desired aforementioned moisture content, or more preferably, a metallurgically compatible dry material is added to the sludge to adjust the moisture content of the mixture to the desired level. The dry material utilized for adjusting the moisture content is selected in accordance with the use to which the recycled iron-bearing dust agglomerates are to be applied. In other words, the dry material is selected to be complimentary to the metallurgical process in which the resultant agglomerates are to be used.

Hydraulic cement is included in the extrudable mixture in the range of approximately 4 – 15% by weight. If wetted iron-bearing dry dust, or sludge which has been artificially dried down to the desired moisture content is utilized in the mixture, then it is not necessary to add additional ingredients.

However, an additional important feature of the present invention is that when an iron-bearing flue dust sludge is utilized in the method, considerable energy savings and reduction of dust conditions are realized by utilizing a dry material to adjust the moisture content of the mixture, and in addition, as previously pointed out, this dry material is selected to have complimentary characteristics for the ultimate metallurgical process in which the resultant agglomerate is to be used.

When the dry material is included in the mixture to adjust the moisture content to the prescribed level, it will be generally found that it will be included in the approximate range of 15 –60% by weight, and the iron-bearing sludge collected as a mill by-product will be included in the mixture in the range of approximately 40 - 70% by weight.

The dry material may be added in the form of coarse particles or fines, and this material may be manufacturing by-products of beneficial value which would otherwise be considered to be of little or no value. For example, the dry material may be dust or coarse particles selected from the group consisting of limestone, coke, coke breeze, coal, crushed slag, iron one, manganese ore, fluorspar, mill sclae, magnesia lime, or by-product dusts such as B.O.F. flue dust, blast furnace dust, or lime dust collected from a lime manufacturing operation, as just a few by-product examples.

The use of coarse dry materials is somewhat preferred over the use of fines as a better resultant extruded agglomerate is obtained. By course particles, is generally meant that most of the particles are greater than 20 mesh and a significant fraction of these are generally one-fourth inch in diameter or larger.

Depending upon the type of metallurgical furnace in which the resultant agglomerates are to be charged, the diameter of the extruded agglomerates is preferably in the approximate range 3 - 14 inches to provide agglomerates of sufficient size to permit free flow of oxygen or air in the furnace charge.

BRIEF DESCRIPTION OF THE DRAWINGS

Other objects and advantages appear in the following description and claims.

The accompanying drawings show, for the purpose of exemplification without limiting the invention or the claims thereto, certain practical embodiments illustrating the principles of this invention wherein:

DETAILED DESCRIPTION OF THE PREFERRED EMBODIMENTS

Figure 1:
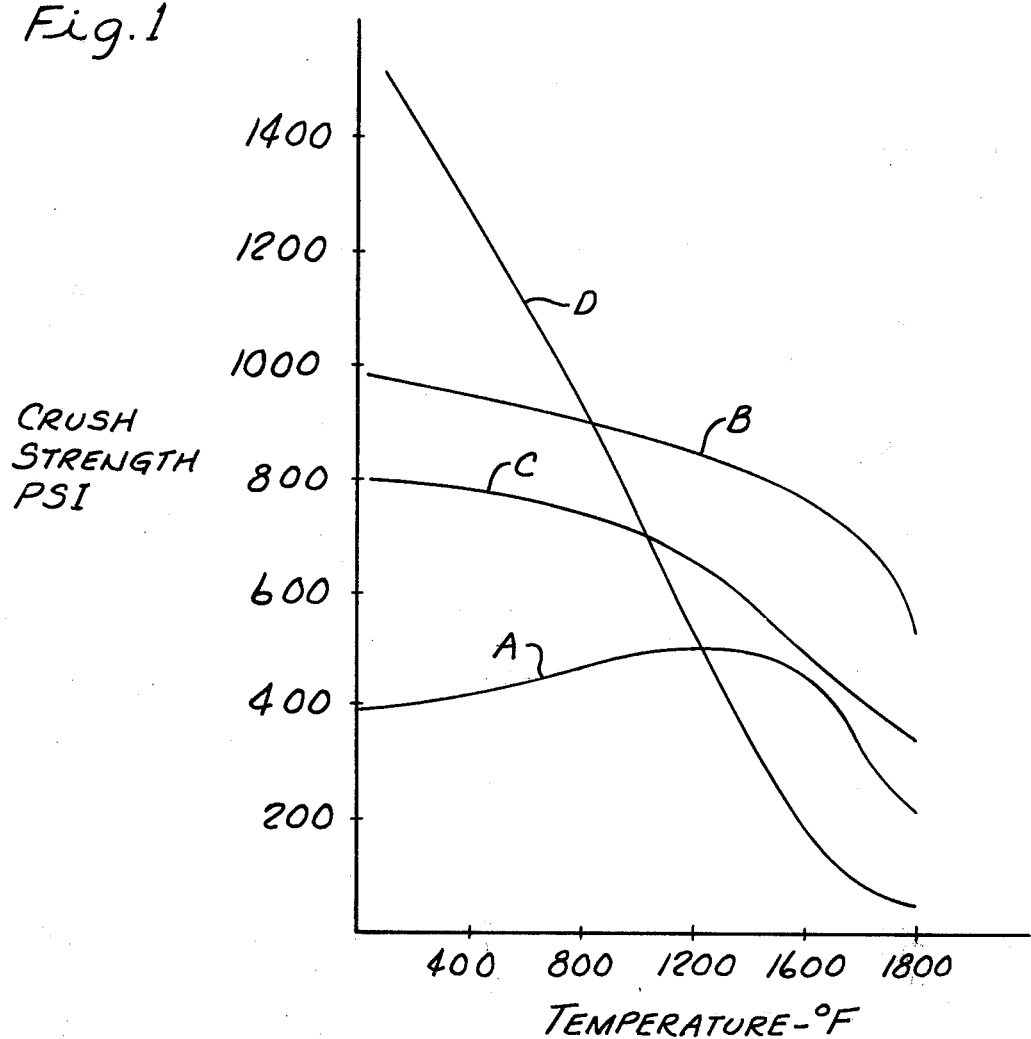
FIG. 1 is a graph illustrating the crush strength of iron-bearing agglomerates manufactured in accordance with the teachings of the present invention in relation to temperature.

The present inventors have discovered that by mixing wet iron-bearing dusts or sludges (including ferromanganese dusts or sludges) with a hydraulic cement such as Portland cement, and with or without other dry additives, the compositions can be then processes by extrusion into agglomerates of desired size and shape. It has been discovered that the basic composition suitable for extrusion contains approximately 4 - 15% hydraulic cement and the remainder constituting the wet iron-bearing dust or sludge; the moisture content of the mixture being extruded being in the approximate range of 8 - 16%.

When the iron-bearing dust is in the form of a sludge containing high percentages of moisture (18 - 35%), the moisture content of the material is controlled by the addition of a beneficial dry material. This dry material may be in the form of by-product dusts or coarse material, wherein the particle size might typically be such that the majority of the particles are greater than 20 mesh and a significant fraction of these would be one-fourth inch in diameter or larger.

The use of coarse materials is preferred, as they aid in the extrusion process and provide strength in the resultant extruded agglomerate both for handling and compressive loads, and they also tend to reduce the necessary percentage of cement needed to form a good agglomerate.

Suitable dry materials, either in the form of a dust or coarse particles, may include, limestone, coke breeze, crushed slag, coal, coke, fluorspar, iron ore, manganese ore, will scale, and many other by-product dusts from manufacturing processes such as B.O.F. dust or lime dust from a lime manufacturing process.

By hydraulic cement, it is meant any mixture of fine ground lime, alumina, and silica that will set to a hard product by admixture of water, which combines chemically with the other ingredients to form a hydrate, such as Portland cement. The agglomerated mixture hardens after extrusion to bind itself into a hard coherent agglomerate.

It has been found that the extruded mixture serves to catalyze the cement hardening process such that extrusions made in the manner taught by the method of the present invention harden such that they are suitable for handling generally after 24 hours at room temperature. The maximum proportion of the binding strength from the cement reaction is generally obtained after 7 to 10 days of curing at room temperature. If desired, the rate of curing can be accelerated by autoclaving, or curing at an elevated temperature with high humidity.

Wet iron-bearing of ferromanganese-bearing sludges from steel making operations generally consist of very fine particles, usually having a 70 - 95% −325 mesh particle size fraction. If these sludges are mixed by themselves with Portland cement, they will harden satisfactorily in accordance with the teachings of the present invention, although they will on the other hand require higher percentages of Portland cement to make the hardened agglomerate, i.e., in the upper limits of the range of inclusion of 4 - 15% by weight. Accordingly, the addition of coarse particles is preferred. While more than 15% Portland cement or hydraulic may be included, it is found that such inclusion becomes wasteful and expensive. Generally, also, the final strength of the agglomerate made with dry as opposed to dry coarse particles will be somewhat weaker. The use of coarse particles also tends to reduce extrusion flaws and increase the rate and quality of extrusion. By extrusion flaws, it is meant the tendency for the material issuing from the extrusion die to exhibit feathering or discontinuous surface irregularities which might serve to weaken the cured agglomerate.

The percentage of inclusion of the dry material whether in the form of a dust or coarse particles is a variable function of such things as the material particle size distribution and density, and naturally also depends upon obtaining the proper moisture content of the final mixture to be extruded, as set forth hereinbefore, such that the mixture is of a plastic consistency which will extrude into cohesive agglomerates. When such dry material is added to the mixture, the wet dust or sludge will generally be included in the approximate range of 40 - 70% by weight, and the dry material will be included generally in an approximate range of 15 - 60%.

A further advantage of these cement hardened extrusions is their weather-ability. These cement hardened compositions can be stored outside and even soaked in water without noticeable degradation. In fact, the longer the extrusions are stored, the stronger they become due to the nature of the cement hardening.

A further advantage of these cement hardened extruded agglomerates over agglomerates made with an organic binder is their function at higher temperatures. In a blast furnace or cupola furnace charge, it is necessary that the agglomerates have enough strength to support the charge above then at the high temperatures reached in many of these operations. Agglomerates made with organic binders often lose most or all of their strength when the organic material burns out at high temperatures, making them unsuitable for furnace charging operations.

An additional advantage of the method of the present invention is that by utilizing extrusion the ability is provided to make very large agglomerates of predetermined diameter. In conventional briquetting or pelletizing operations, there is a practical limit to the size of the finished agglomerates. This is not so with the extrusion techniques utilized in the method of the present invention.

For example, with a large auger driven continuous extruder, it is quite feasible to extrude a continuous cylindrical column of material having a diameter anywhere from 3 - 14 inches. This continuous column is cut into units of desired length and set aside to cure.

Such larger agglomerates are desirable, for example, in some cupola melting furnaces where gas pressures are not high enough to force hot gases through a bed of smaller particles. Large agglomerates may also be desirable as a B.O.F. coolant as the greater weight of large agglomerates penetrates deeper into the molten bath upon impact, producing more efficient cooling.

A further advantage of the iron-bearing agglomerates manufactured in accordance with the method of the present invention is that substantial savings can be realized in terms of cost and energy. Other techniques for recycling steel mill waste sludges are briquetting or pelletizing and sintering. In all three operations, the wet sludge must be dried down before agglomerating. In a pelletizing operation, wet sludges must first be dried down and the dried dust is subsequently re-wetted and rolled into pellets, which are then fired at high temperatures to harden the pellets. In sintering operations, the sludge must also be dried down and is then sintered with other materials, once again at very high temperatures. The process of the present invention to form cement hardened agglomerates by extrusion requires no drying steps either for the sludge or the final agglomerates. While such drying may be utilized, it is not preferred or required, as even the dried by-product flue dust may be first formed into a sludge and the moisture content adjusted by adding the desired dry material. For this reason, it is a more efficient process in terms of both cost and energy, and in addition, it cuts down on undesirable atmospheric dust conditions in the manufacture of the agglomerates. Actual examples of the method of the present invention are set forth hereinafter.

All of the following examples were extruded with an auger driven extrusion machine having an auger diameter of three inches, through a tapered die having a straight untapered end section three inches long. The compositions were premixed in a mixer and then fed to the extruder. It should be noted, however, that mixing may be carried out in a pug mill section of an extruder itself. Continuous extrusion columns were produced and cut into unit lengths for testing purposes. Compressive strength data, illustrated hereinafter, was gathered by measuring the force necessary to crumble the extrusion, this force being applied in a direction perpendicular to the axis of extrusion.

EXAMPLE 1

50% by weight of a used crushed B.O.F. slag having a moisture content of 5%; 40% by weight of a B.O.F. sludge containing 20% moisture; 10% type 1 Portland cement; and water were mixed together and fed to the extrusion machine at a moisture level of 11%. The used B.O.F. slag had a dry density of 120 pounds per cubic foot and a screen analysis and chemistry as follows:

| SCREEN ANALYSIS | APPROXIMATE CHEMICAL ANALYSIS, DRY BASIS |
|---|---|
| 33% + ¼" material | Metallic Iron - 25% |
| 25% - ¼" + 8 mesh | Iron Oxides - 20% |
| 20.4% - 8 mesh + 20 mesh | Magnesium Oxides - 4% |
| 13.9% - 20 mesh + 100 mesh | Magnanese Oxides - 6% |
| 3.3% - 100 mesh + 200 mesh | Calcium Oxide - 35% |
| 4.2% - 200 mesh | $SiO_2$ - 10% |
| | Phosphorous - ½% |
| | Sulfur - .1% |

The B.O.F. sludge had a wet screen analysis of 93% — 325 mesh material, and a chemical analysis on a dry basis as follows:

| | |
|---|---|
| Iron Oxide = 82.5% | MgO = 2.34% |
| Manganese Oxide = 2.01% | $Na_2O$ = .31% |
| Phosphorous = .11% | $K_2O$ = .09% |
| $SiO_2$ = 2.09% | Lead = .47% |
| $Al_2O_3$ = .88% | Zinc = .31% |
| CaO = 7.59% | Sulfur = .29% |

This mixture of material having a moisture content of 11% extruded very well giving a good coherent extrusion with smooth sides. After 24 hours, this material had a compressive crush strength of 150 p.s.i. and was satisfactorily hardened for handling purposes. After ten days, the extrusions had a compressive crush strength of 400 p.s.i. The compressive strength of this extruded material as a function of temperature is shown as Curve A in FIG. 1. This curve may be compared with metallurgical coke represented by the Curve B. While this material is not as strong at high temperatures as sintered pellets or metallurgical coke, it has sufficient strength to be used as a small percentage of a furnace charge.

The composition may also be used as a B.O.F. Coolant. In basic oxygen steel making, a coolant is added to the heat after blowing to reduce temperature. Commonly used material for B.O.F. coolants include such things as limestone, iron ore, or scrap steel. The extruded composition of this example provides a very economical coolant material. The use of this composition is also desirable because some of the free iron in the used B.O.F. slag is recovered when it is utilized as a coolant.

The large agglomerate sizes that can be obtained with extrusion (3 to 15 inches in diameter and several feet long) make this material especially suited for coolant uses. The larger agglomerates not only tend to penetrate more deeply into the molten bath, but in addition, the extruded agglomerates are somewhat porous to water and can carry free water without losing any strength, as opposed to iron ore, limestone and scrape which are not porous and cannot carry free water. In addition to free water, these cement hardened extrusions also carry water of hydration, which is tied up in the cement bond. The presence of some water in the B.O.F. coolant is desirable due to its higher cooling effect per unit cost. The following table shows the affect of some coolant materials:

| Addition of 100 Pounds | Cooling Affect Produced |
|---|---|
| Pig Iron | 55,000 BTU's |
| Steel Scrap | 59,000 BTU's |
| Dry Ore | 128,000 BTU's |
| Water | 141,500 BTU's |

EXAMPLE 2

A mixture of coke fines, B.O.F. sludge and Portland cement was agglomerated by extrusion. 35% by weight of coke fines having a moisture of 3%, 55% by weight B.O.F. sludge having a moisture of 19%, 10% by weight, Type 1A Portland cement and water, were mixed together in a rotary mixer. This material had a moisture of 12.5% and was fed to the extrusion machine. The coke fines had a dry density of 60 pounds per cubic foot and a screen analysis of:

| 26.8% | $+\frac{1}{4}''$ material | 6.3% | −100 mesh, +200 mesh |
|---|---|---|---|
| 13.5% | $-\frac{1}{4}''$, +8 mesh | 7.9% | −200 mesh |
| 20% | −8 mesh, +20 mesh | | |
| 25.4% | −20 mesh, +100 mesh | | |

Figure 2:
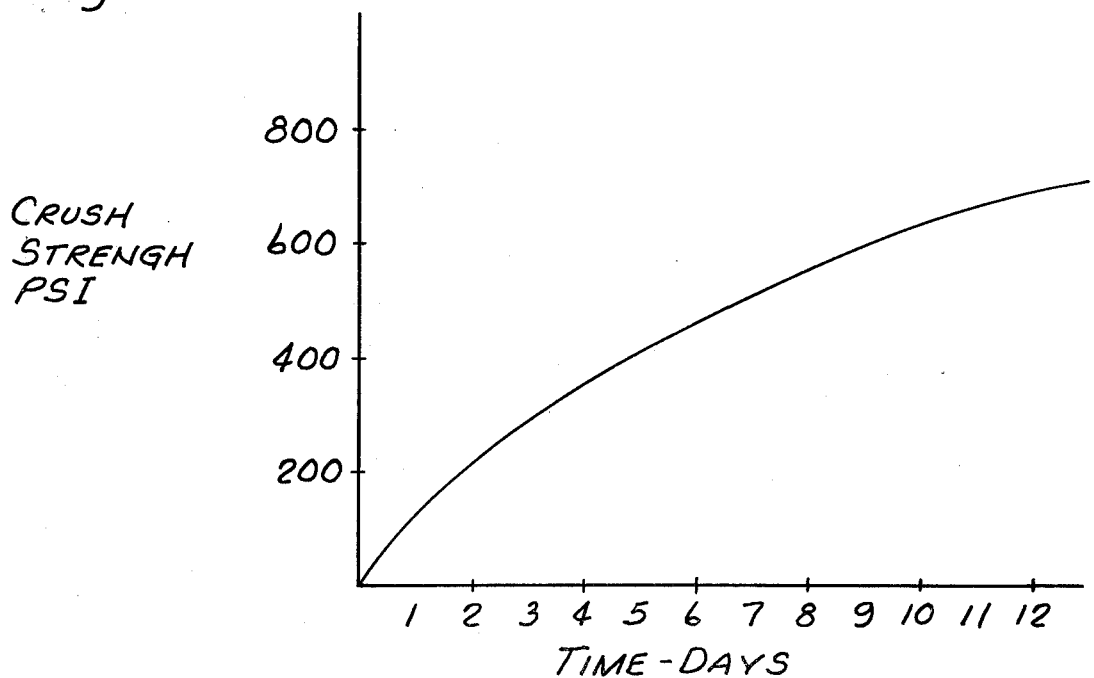
FIG. 2 is a graphic illustration of the crush strength of the iron-bearing agglomerates of the present invention in relation to time of curing of the extruded agglomerates.

The B.O.F. sludge was similar in screen analysis and composition to the materials in Example No. 1. This material extruded well at a high rate of extrusion and produced an extruded column having smooth sides with no flaws. FIG. 2 shows the compressive crush strength of this material as a function of curing time. FIG. 1 shows the compressive crush strength as a function of temperature by Curve C. The good compressive crush strength of this material at high temperatures makes it a suitable material to be used as a furnace charge.

A further advantage of these extruded agglomerates when used as a furnace charge is the fact that iron oxide and carbon are pre-combined and in intimate contact thus favoring a faster and more efficient reducing reaction between the two materials. A cupola or electric furnace effectively uses a large extruded agglomerate of this composition, especially since the carbon and coke are pre-combined and in intimate contact. In a blast furnace, it is desirable to have a smaller particle size (generally 2 inches) in the furnace charge. For a blast furnace application, smaller extrusions are made through a multiple hole die, or a large single column extrusion can be produced and later crushed to give a smaller diameter charge distribution.

EXAMPLE 3

Coarse manganese ore, wet ferromanganese precipitator dust and cement were extruded together to form a cement hardened agglomerate. 40% manganese ore having a moisture of 15.2%, and 60% ferromanganese precipitator dust having a moisture of 30.9%, and 10% Type 1A Portland cement were mixed together in a rotary mixer. This material was fed to the extrusion machine, at a moisture of 21.5% and extruded into 2 inch diameter cylindrical columns which were set aside to cure. The manganese ore had a screen analysis and chemistry as follows:

| SCREEN ANALYSIS | CHEMICAL ANALYSIS (On a dry basis) |
|---|---|
| $+\frac{1}{4}'' = 33\%$ | Manganese = 45.6% |
| $-\frac{1}{4}'' + 8$ mesh = 25% | Phosphorous = .09% |
| −8 mesh + 20 mesh = 20.4% | Sulfur = .013% |
| −20 mesh + 100 mesh = 13.9% | $SiO_ = 10.94\%$ |
| −100 mesh + 200 mesh = 3.3% | $Al_.O = 3.42\%$ |
| −200 mesh = 4.2% | CaO = .9% |
| | MgO = .89% |
| | Fe = 3.42% |
| | Carbon = .72% |

The wet ferromanganese precipitator dust had a screen analysis of 91% passing a −325 mesh screen. The chemical analysis follows:

| CHEMICAL ANALYSIS | |
|---|---|
| Iron = 1.2% | Phosphorous = .09% |
| Manganese = 25.5% | Sulfur = .016% |
| $SiO_. = 7.76\%$ | $Al_.O_. = 8.47\%$ |
| CaO = 10.9% | MgO = 5.16% |
| Carbon = 4.36% | $Na_.O = .34\%$ |
| $K_.O = 4.4\%$ | $Li_.O = .3\%$ |

This material made a smooth walled good quality extrusion having a compressive crush strength of 1500 p.s.i. after two weeks. The compressive crush strength as a function of temperature is shown in Curve D of FIG. 1. This material represents a good manner in which to add manganese units to a furnace charge. The utilization of the wet precipitator dust is of economic importance due to the value of the manganese units. The difference in Curve D in relation to the other curves of FIG. 1 is believed to be caused by the manganese content of the agglomerate.

EXAMPLE 4

1,000 lbs. of the following composition was charged and thoroughly mixed in a rotary mixer: 45% B.O.F. sludge having a moisture of 34%, 51% dry iron oxide-earing dust from an open hearth dust collector, and 4% Type 1 Portland cement. After mixing to a plastic consistency, this composition was charged into a conveyor belt feeding an auger driven extruder having a 9 inch diameter point auger, and an extrusion die consisting of a straigth piece of pipe having an inside diameter of 5 inches and a length of 8 inches. The aforementioned composition was compressed by the helical augers which were turning at 30 r.p.m. through the die and issued out the end of the die as a 5 inch diameter continuous cylindrical column. As the column issued from the die, it was broken into lengths from 4 to 7 inches. The green extrusions were then set aside to cure at room temperature for 24 hours, after which time they were judged to be hardened satisfactorily for handling.

This composition in the form of a large agglomerate makes a very economical way to process B.O.F. sludge and iron-bearing dusts in such a way that they can be profitably recycled in steel making operations. At a level of 4% cement, the extrusions are not tremendously strong, yet have sufficient strength for handling. This composition has an end use as a B.O.F. coolant or as a charge ore substitute for open hearth or cupola furnaces.

We claim:

1. The method of recovering wet iron-bearing flue dusts collected as a by-product sludge from metallurgical process wet scrubbers for recycling, comprising the step of, reducing the moisture content of the wet flue dust sludge to a level at which the wet dust is of a plastic consistency which will extrude into cohesive agglomerates, by continually mixing with the sludge in pug mill means a metallurgically compatible dry material and sufficient hydraulic cement to rigidly bond the mixture into a cohesive mass after curing, continually extruding the mixture through an extrusion die into cohesive agglomerates, and curing the extruded agglomerates at ambient temperatures.

2. The method of claim 1 wherein the moisture content of the mixture being extruded is 8 to 16 percent by weight.

3. The method of claim 1 wherein said hydraulic cement is included in the mixture in the range of approximately 4 to 15 percent by weight.

4. The method of claim 1 wherein the iron-bearing flue dust sludge has an average moisture content of greater than 18%.

5. The method of claim 4 wherein the dry material is included in the mixture in the range of approximately 15 to 60 percent by weight.

6. The method of claim 4 wherein the sludge is included in the mixture in the range of approximately 40 to 70 percent by weight.

7. The method of claim 6 wherein said dry material is selected from the group consisting of limestone, coke, coke breeze, coal, crushed slag, iron ore, manganese ore, fluorspar, mill scale, lime and by-product dusts.

8. The method of claim 7 wherein said dry material is in the form of coarses wherein the majority of the coarse particles are greater than 20 mesh and a significant fraction thereof are larger than one-fourth inch in diameter.

9. The method of claim 1 wherein the diameter of said extruded agglomerates are in the approximate range of 3 to 14 inches.

10. The method of claim 1 including the step of charging said cured agglomerates to a metallurgical furnace.

11. An iron-bearing agglomerate manufactured by the process comprising the steps of reducing the moisture content of wet flue dust collected as a by-product sludge from metallurgical process wet scrubbers to a level at which the wet dust is of plastic consistency which will extrude into cohesive agglomerates by continually mixing with the sludge in pug mill means a metallurgically compatible dry material and sufficient hydraulic cement to rigidly bond the mixture into a cohesive mass after curing, continually extruding the mixture through an extrusion die into cohesive agglomerates, and curing the extruded agglomerates at ambient temperatures.

12. The iron-bearing agglomerate manufactured by the process of claim 11 wherein the moisture content of the mixture being extruded is 8 to 16 percent by weight.

13. The iron-bearing agglomerate manufactured by the process of claim 11 wherein said hydraulic cement is included in the mixture in the range of approximately 4 to 15 percent by weight.

14. The iron-bearing agglomerate manufactured by the process of claim 11 wherein the iron-bearing flue dust sludge has an average moisture content of greater than 18%.

15. The iron-bearing agglomerate manufactured by the process of claim 14 wherein the dry material is included in the mixture in the range of approximately 15 to 60 percent by weight.

16. The iron-bearing agglomerate manufactured by the process of claim 15 wherein the sludge is included in the mixture in the range of approximately 40 to 70 percent by weight.

17. The iron-bearing agglomerate manufactured by the process of claim 14 wherein said dry material is selected from the group consisting of limestone, coke, coke breeze, coal, crushed slag, iron ore, manganese ore, fluorspar, mill scale, lime and by-product dusts.

18. The iron-bearing agglomerate manufactured by the process of claim 11 wherein said dry material is in the form of coarses wherein the majority of the coarse particles are greater than 20 mesh and a significant fraction thereof are larger than one-fourth inch in diameter.

19. The iron-bearing agglomerate manufactured by the process of claim 11 wherein the diameter of said extruded agglomerates are in the approximate range of 3 to 14 inches.

20. The iron-bearing agglomerate manufactured by the process of claim 11 including the step of charging said cured agglomerates to a metallurgical furnace.

* * * * *